United States Patent

Dhindsa et al.

[11] Patent Number: 5,235,259
[45] Date of Patent: Aug. 10, 1993

[54] APPARATUS AND METHOD FOR CONTROLLING A MOTOR

[75] Inventors: Jasbir S. Dhindsa, Sugarland; Hector C. Arambula, Houston, both of Tex.

[73] Assignee: Tech Power Controls Co., Houston, Tex.

[21] Appl. No.: 610,545

[22] Filed: Nov. 8, 1990

[51] Int. Cl.⁵ .................................................. H02P 7/00
[52] U.S. Cl. .................................... 318/434; 318/432; 388/903; 388/917; 388/815; 361/30
[58] Field of Search ................. 361/33, 31, 30, 79, 361/86-87, 91, 93, 100; 388/903, 917, 930, 815; 312/432, 434

[56] References Cited

U.S. PATENT DOCUMENTS

| | | | |
|---|---|---|---|
| 3,814,986 | 6/1974 | Zanini | 317/13 R |
| 3,983,464 | 7/1976 | Peterson | 388/903 X |
| 4,182,979 | 1/1980 | Douglas et al. | 388/903 X |
| 4,648,003 | 3/1987 | Braitinger et al. | 361/31 |
| 4,761,703 | 8/1988 | Kliman et al. | 361/31 X |
| 4,780,656 | 10/1988 | Mitchell | 388/903 X |
| 4,810,943 | 3/1989 | Kawaguchi et al. | 388/903 X |
| 4,910,447 | 3/1990 | Masters | 388/903 X |

Primary Examiner—William M. Shoop, Jr.
Assistant Examiner—David Martin

[57] ABSTRACT

An apparatus and method for controlling a motor used for rotating a drill stem is disclosed. Silicon control rectifier based system regulates the power to the motor. A control unit coupled to the SCR regulator and the motor monitors the motor input current, voltage and speed levels. If during operation the motor current exceeds a predetermined value and at the same time the motor voltage or speed falls below a predetermined value, the control unit activates an alarm condition and causes the SCR regulator to controllably ramp down the current supply to the motor and then reduces the motor speed reference.

6 Claims, 4 Drawing Sheets

APPARATUS AND METHOD FOR CONTROLLING A MOTOR

BACKGROUND OF THE INVENTION

1. Field of the Invention

This invention relates to an apparatus and method for use in drilling wells, and more particularly to an apparatus and method for controlling the operation of a motor used for operating a drill stem.

2. Background of the Related Art

Electric motors, especially direct current or dc motors, are commonly used to rotate a drill stem for drilling wells. The drill stem includes a drill pipe having a drill bit at one end. Silicon control rectifier (commonly known as "SCR" in the art) based control systems are typically used to supply regulated dc power to the motor. These systems have been used for many years in the industry and their operation is well known in the art. However, for the present purpose it is considered helpful to explain the prior art control systems by way of a functional block diagram, which is shown in FIG. 1.

Typical prior art control systems include an operator's console 30 and SCR drive and regulator 40. The SCR drive and regulator 40 supplies regulated power to the motor 10 via a conductor 54. The motor drives a gear box 14, which in turn rotates the drill pipe 18.

To start drilling, the operator sets the maximum permissible torque limit for the drill pipe by setting an upper current level that the SCR drive and regulator 40 may supply to the motor 10 by setting a torque control means 34 on the operator's console 30 and then increases the motor speed from its normal off-state speed, generally zero rpm, by adjusting a throttle or speed reference means 32 until a desired speed is set.

The SCR drive and regulator 40 receives the throttle and torque reference signals on lines 33 and 35 respectively and in response thereto supplies a constant or near constant voltage to the motor. The current supplied to the motor 10 (the motor input current) varies depending upon load placed on the motor, which is a function of the drill pipe torque. The drill pipe torque in turn depends upon borehole parameters, such as the borehole depth, borehole size, drill pipe weight, sustain formation borehole mud density, etc. As the borehole depth increases, additional pipe sections are connected to the drill pipe. The drill pipe always extends to the well depth, which continues to increase the drill pipe weight and thus the load on the motor. Individual drill pipe section are 20-50 feet long, thus the drill pipe has a pipe joint or a mechanical connection every few feet. These pipe joints from the weak points on the drill pipe.

The prior art systems operate acceptably as long as the motor is able to drive the drill stem within the parameters set by the operator. However, these prior art systems have severe drawbacks when the drill bit or drill pipe gets stuck or when the drill pipe torque increases beyond the drill pipe break point. When the drill pipe or drill bit gets stuck, it will continue to wind on itself about the point where it is stuck, causing the torque to continue to increase, thereby requiring the motor to demand increasing amounts of current so that it may maintain the preset speed.

The SCR drive and regulator 40 continues to increase the current to the motor until it reaches the current limit set by the operator. Thereafter, the voltage to the motor starts dropping as the motor speed drops until the drilling stops because the drill pipe is stuck.

In many cases, the operator becomes aware that the drill pipe is stuck only after the drill pipe has wound on itself or twisted to a substantial degree. Sometimes the operator finds out about this abnormal condition when the drilling shuts down. Under these abnormal conditions, operators frequently panic and either reduce the current limit too quickly or inadvertently reduce the throttle or motor speed reference before slowly lowering the upper current limit to zero. In either situation, the drill pipe will unwind too quickly, which may cause the pipe joints to become loose or even break. This will require the drill pipe to be pulled out from the borehole to repair the pipe joints or to fish-out the broken pipe portion left in the borehole, causing the drilling operation to stop for several hours, which can cost several thousand dollars per hour. More importantly, an operator error as noted above can cause serious injury to the personnel working on the drilling platform.

It is, therefore, highly desirable to have a system which will provide a warning soon after a drill pipe gets stuck during drilling or when the load requirements on the motor exceed a predetermined value and which system will controllably unwind the drill pipe to ensure that the drill pipe joints will not become loose or break and that the safety of the operators and equipment is not compromised.

The present invention provides a control system which addresses the above described problems with the prior art systems by providing an apparatus and method which detects these adverse conditions, provides audio and visual warnings to the operator, and controllably and safely unwinds the drill pipe.

SUMMARY OF THE INVENTION

An apparatus and method for regulating power to an electric motor used for driving a load is disclosed. The system comprises a regulator for regulating the voltage and current to the motor in response to preset reference parameters and the load on the motor. A control circuit coupled to the motor and the regulator is adapted to cause the regulator to controllably ramp down the current to the motor to a predetermined value when during operation the motor speed or voltage falls below a predetermined value and the motor current is above a predetermined value.

Examples of more important features of the invention thus have been summarized rather broadly in order that the detailed description thereof that follows may be better understood, and in order that the contributions to the art may be better appreciated. There are, of course, many additional features of the invention that will be described hereinafter and which will form the subject of the claims appended hereto.

BRIEF DESCRIPTION OF THE DRAWINGS

For detailed understanding of the present invention, reference should be made to the following detailed description of the preferred embodiment, taken in conjunction with the accompanying drawings, in which like elements have been given like numerals and wherein.

DESCRIPTION OF THE PREFERRED EMBODIMENT

Figure 1:
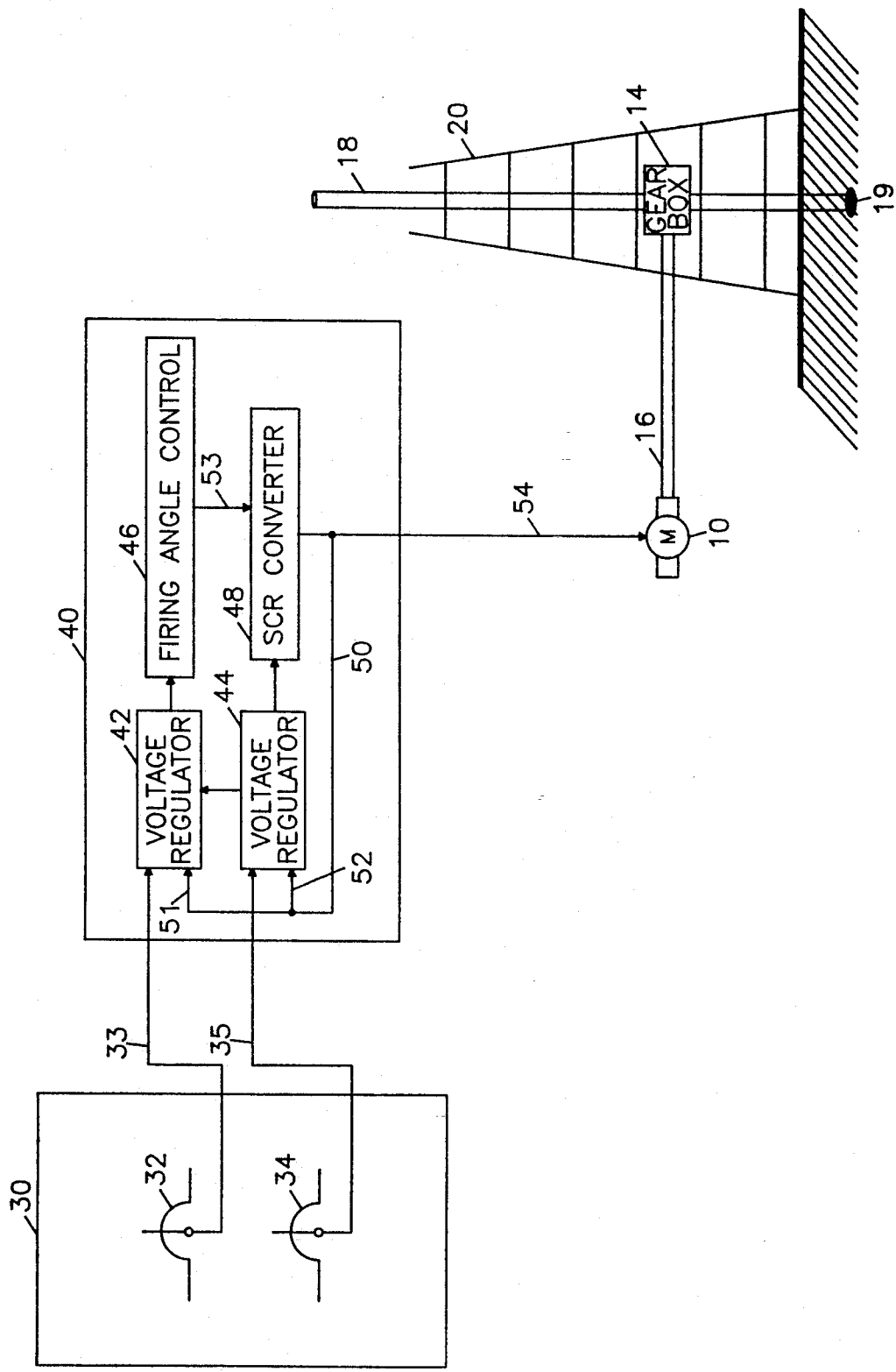
FIG. 1 Shows a block diagram of a typical prior art system for controlling the operation of a motor for drilling wells.
Figure 2:
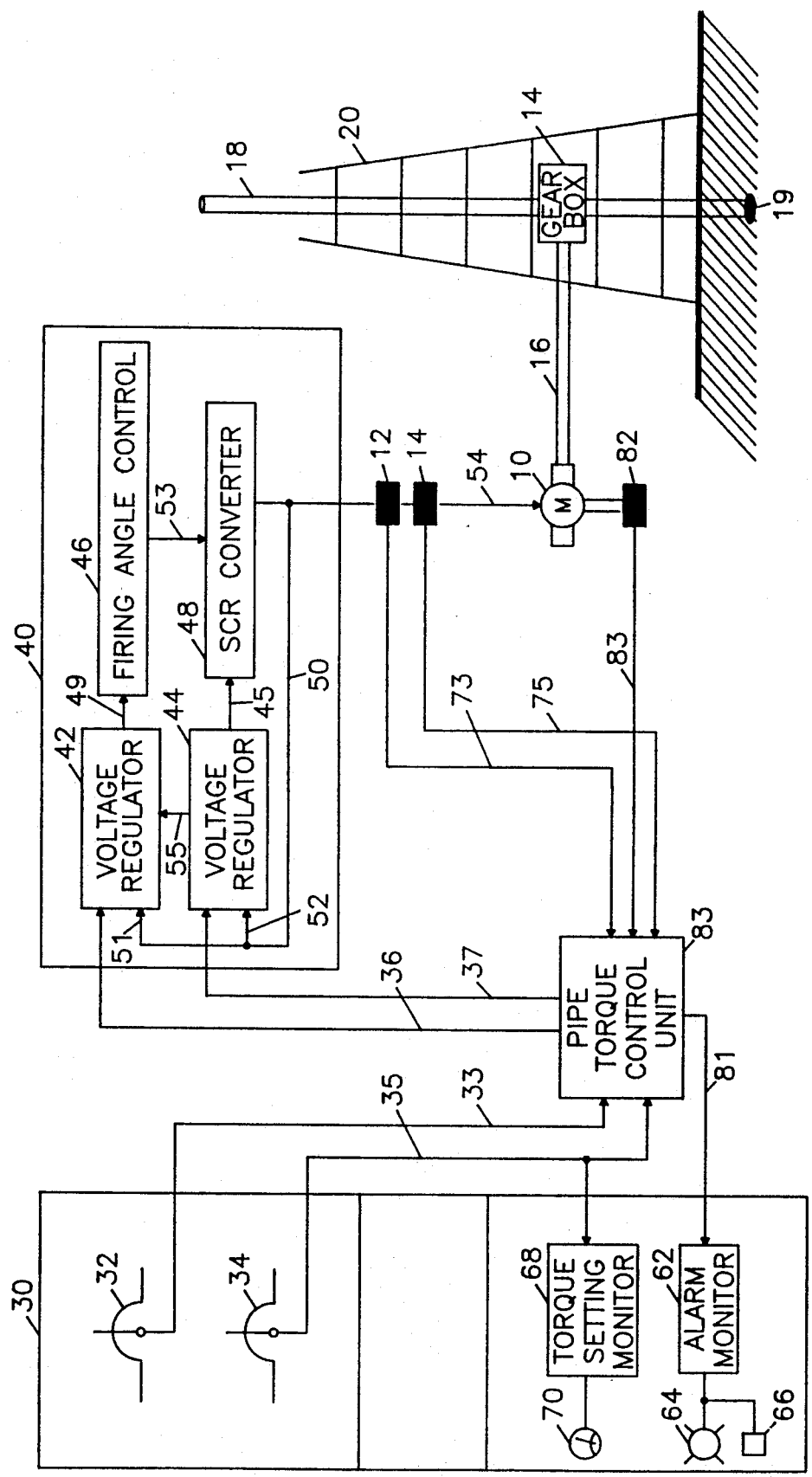
FIG. 2 Shows a block diagram of the control system of the present invention.

FIG. 2 shows the system of the present invention in a functional block diagram form. It includes a motor for rotating a drill stem, an SCR drive and regulator for supplying regulated power to the motor, an operator's console adapted for setting operating parameters for the system, a pipe torque control unit for detecting abnormal operating conditions and in response thereto controlling the operation of the SCR drive and regulator, and an alarm means for indicating the detected adverse conditions.

The system of FIG. 2 contains a motor 10 for rotating a drill pipe 18 located on a rig or platform 20. The motor 10 is coupled to a gear box 14 via a rotatable shaft 16. The gear box 14 steps down the motor rpm and turns or rotates a rotary table (not shown). FIG. 2 shows one commonly used arrangement of the motor 10 and gear box 14 for drilling wells. In another arrangement, the motor and gear box combination may be mounted on the drill pipe itself to provide necessary rotational force for rotating the drill pipe. Such systems are sometimes referred in the industry as top drive systems. It should be noted that for the purpose of this invention, any suitable motor arrangement may be used to invention, any suitable motor arrangement may be used to operate the drill pipe 18. The drill pipe 18 has attached to its lower end a drill bit 19, which during drilling operation is in contact with the ground or the bottom of the borehole being drilled. When the drill pipe rotates, the drill bit 19 drills a borehole.

Under normal drilling conditions, the motor rotates at or near a constant speed, which is determined by the motor input voltage. As the load on the motor increases, motor input current is increased to provide necessary torque to rotate the drill pipe 18 at the predetermined constant speed. In the system shown in FIG. 2, the motor receives the electrical energy, i.e., voltage and current from a controlled power source, such as a silicon control rectifier based system 40, usually referred to as an SCR drive and regulator. The SCR drive and regulator 40 performs two basic functions: (1) it receives alternating current power (AC power) from a power line or an AC generator (not shown) and converts it into a dc power and (2) it regulates the electric power supplied to a device, such as a motor 10. The desired electric power to the motor 10 depends upon various factors, such as borehole depth, borehole size, mud density, geophysical parameters of the earth's formation, available equipment and safety factors.

The three important parameters that are used to control the SCR drive and regulator output are the maximum allowed pipe torque or the upper current limit for the motor 10, the motor speed, and the motor voltage. A predetermined value of the upper current or pipe torque limit and the motor speed are normally established before starting the drilling operation. These and other control functions are usually provided on a control panel 30 located at a place which is convenient to the operator. To start the motor, the operator first sets the upper current limit for the motor by setting a control means, such as a variac 34, at a desired upper limit "Iu" and then slowly increases the throttle or the motor speed reference from a normal off-state to a predetermined desired level Vc through a control means 32. The current limit is set to prevent the SCR drive and regulator from supplying current above that limit to protect the drill pipe from overtorquing, which can result in breaking the pipe or pipe joints.

The throttle and torque control means 32 and 34 are electrically coupled to a pipe torque control unit 80 via electrical conductors 33 and 35 respectively. The pipe torque control unit 80 provides control signals corresponding to the preset throttle reference and current limit to the SCR drive and regulator 40 via cables 36 and 37 respectively. A voltage sensor 12 is placed at a line 54 to provide the motor input voltage to the pipe torque control unit 80 via a conductor 73. A current sensor is also placed in the line 54 to provide the motor input current value to the pipe torque control unit 80 via a cable 75. A motor speed sensor 82 provides the motor speed to the pipe torque control unit 80 via a line 83. The pipe torque control unit 80 is also coupled to an alarm monitor 62 for providing an electrical signal to activate a visual alarm 64 and/or an audio alarm 66 when pipe overtorque condition exists.

Figure 3:
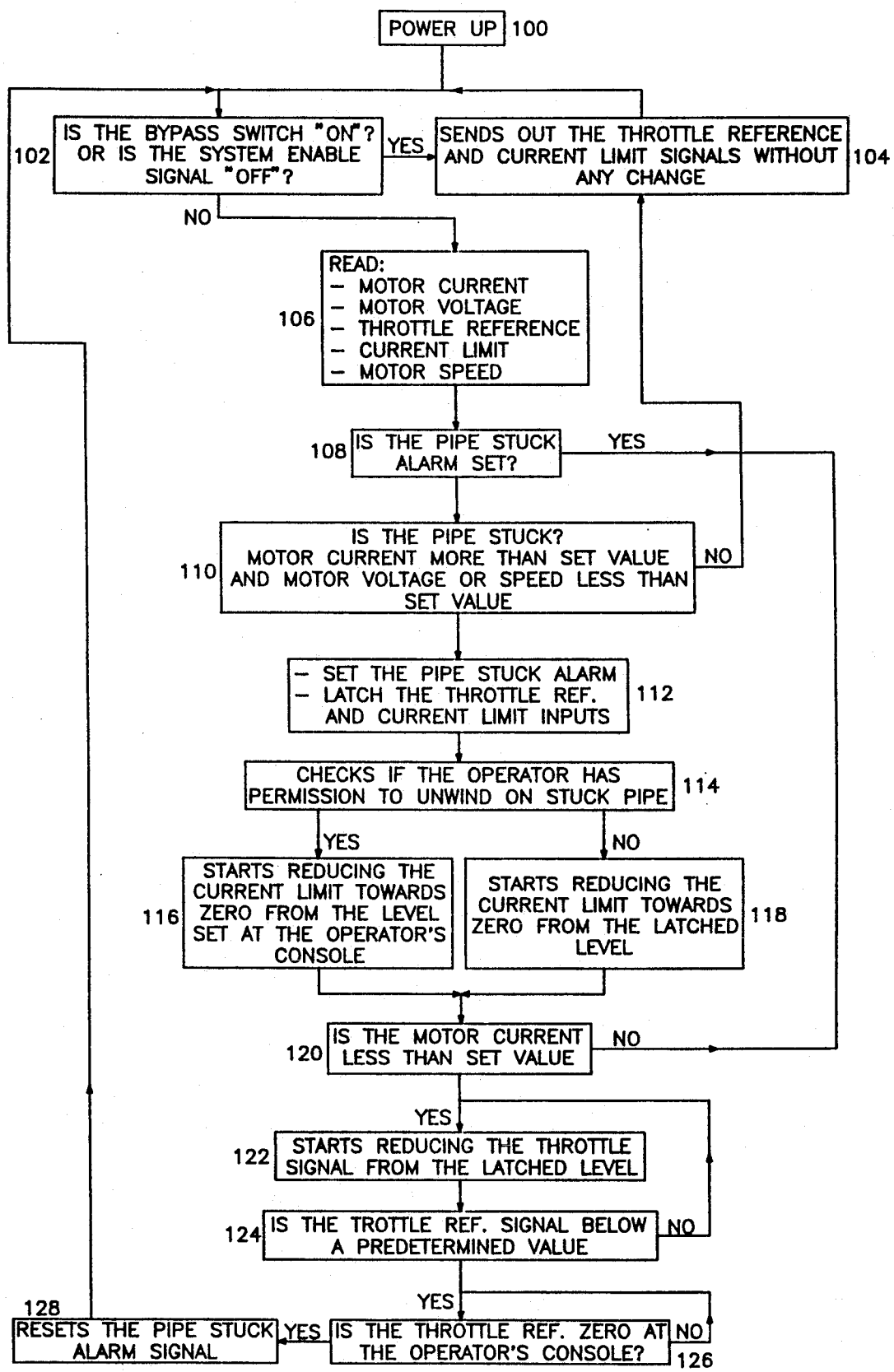
FIG. 3 Show a flow diagram depicting the decision making logic used for the control system of FIG. 2.

The operation of the pipe torque control unit 80 in conjunction with the SCR drive and regulator 40 to control the motor operation will now be described in detail while referring to FIGS. 2 and 3. FIG. 3 shows the flow diagram for the control logic used by the pipe torque control unit 80 to control the operation of the system of FIG. 2. However, to understand the operation, it is necessary to define certain terms as used herein.

A pipe-stuck condition is said to exist when the motor input voltage or speed falls below a predetermined value and the motor input current is at or above a predetermined value. Any desired motor speed, voltage and current value combination may be used to indicate an abnormal drilling condition.

The pipe torque control unit 80 maybe programmed to contain any number of throttle reference and upper current limit combinations, and the control unit 80 may be set at a particular combination to control the motor operation. The pipe torque control unit 80 may also be programmed to include allowable upper current limits that the operator can set for given drill pipe sizes and grades. Each time the operator activates the system in the drilling mode, the operator may be required to enter the actual pipe size and grade being used. The pipe torque control unit 80 will not allow the operator to set the upper current limit above the corresponding preprogrammed value.

Normally, when the control system of FIG. 2 is off, the motor input voltage and current are zero. Each time the control system is turned on, the pipe torque control unit 80 ensures that the pipe-stuck condition is not present, i.e., the motor input voltage obtained from the sensor 12 is below a predetermined value or the motor speed is below a predetermined value and the motor current obtained from the current sensor 14 is at or above a predetermined value. Assuming the pipe-stuck condition is clear, the operator first sets the upper torque or current limit by properly setting the current-/torque limit control means 34 to a predetermined value and then slowly increases the motor speed by increasing the motor speed/throttle setting 32 until the motor has achieved a desired speed.

As long as the stuck-pipe condition is not present, the pipe torque control unit 80 allows the upper current limit signal and the throttle reference signal from the operator's console 30 to go directly to the current regulator 44 via a conductor 37 and voltage regulator 42 via a conductor 36 respectively. The SCR drive and regulator 40 in response to these signals and the load on the motor 10 supplies power (voltage and current) to the motor via a cable 54.

FIG. 2 shows a rather simplified block diagram of the SCR drive and regulator, because such systems have been used in the oil and gas and other industries for many years and their function and operation is well known in the art. FIG. 2 shows only the functions which are deemed necessary to adequately and properly describe the system of the present invention.

A feedback loop 51 and 52 provides the voltage regulator with the motor input voltage while the feedback loop 50 and 52 provides the current regulator 44 the motor input current. The current regulator 44 is coupled to the voltage regulator 42 via a conductor 55. The voltage regulator 42 is coupled to a firing angle control circuit 46. The firing angle control circuit sets the firing angle of the SCR converter 48 in response to the input from the voltage regulator 42. The firing angle determines the amount of AC power received from a powerline or an AC generator (not shown) that will be rectified. The AC power from the powerline is normally 600 volts but the output voltage of the SCR converter varies depending upon the desired speed of the motor 10.

The SCR converter 48 converts the AC power into a DC power and provides it to the motor 10 via the conductor 54. During normal operation, the SCR converter maintains a constant or near constant voltage to the motor 10 so as to drive it at a constant speed. However, the amount of current supplied to the motor is a function of the load on the motor, which depends upon the drilling parameters such as the weight of the drill pipe 18, borehole mud density, the rock formation being drilled and the like. The SCR converter adjusts the motor input current to provide sufficient torque to maintain a constant motor speed. As the load on the motor changes, i.e., the torque on the pipe 18 changes, the SCR drive and regulator 40 adjusts the motor current accordingly so as to maintain the motor input voltage or motor speed, and hence the motor at the predetermined speed. As the borehole depth continues to increase, the pipe torque also continues to increase and the SCR drive and regulator 40 continues to increase the motor current until it reaches the preset upper current limit. As noted earlier the pipe torque control unit 80 continues to monitor the motor input voltage or motor speed and current levels to determine that the stuck-pipe condition does not exist.

If the drill pipe torque continues to increase after the motor input current has reached the preset upper limit, the current regulator 44 overrides the voltage regulator 42 and causes the firing angle to decrease, thereby decreasing the voltage to the motor, which causes the motor speed to decrease. If the pipe torque continues to increase, either because of the adverse downhole conditions or the original current limit was incorrectly set or the drill pipe 18 is stuck, the motor voltage will continue to decrease and may fall below the preset level by the operator. If the motor load conditions are such that the motor voltage or speed and current values meet the stuck-pipe criteria, the pipe torque control unit 80 detects such a condition and takes a series of actions as shown by the flow diagram blocks 112-128 of FIG. 3.

The pipe torque control unit 80 causes the alarm monitor to activate the visual and/or audio alarms 64 and 66 and latches the throttle reference and current limit values being received from the operator's console via lines 33 and 35 respectively. If the operator had previously set the torque pipe control unit to an automatic mode, which means that the operator had relinquished the control to the unit 80, the torque control unit 80 will controllably start reducing or ramping down the upper current limit value supplied to the current regulator 44 from the latched value to a lower level, set by the operator, as indicated by block 118 of FIG. 3. If the operator had set the pipe torque control unit 80 to a manual mode, i.e., that the operator could manually reduce the upper current limit even when the pipe-stuck condition is detected, the pipe torque control unit still starts ramping down the current limit toward a predetermined value but from the new value, set by the operator on the current limit at the operators console. Once the upper current limit has been reached to a predetermined value, the pipe torque control unit 80 then and only then starts reducing in a controlled manner the throttle reference to a predetermined value, as shown by the blocks 122 and 124 of FIG. 3.

The torque pipe control unit is programmed so that any desirable ramp down rates may be set prior to starting the drilling operation. Specific ramp down rates also may be set during manufacturing of the pipe torque control units. For most applications, a ramp down time from 15 to 60 seconds is considered adequate. However, any desirable ramp down rate may be set. It should be noted that when the current limit is being ramped down, the drill pipe is unwinding, i.e., it is turning in the direction counter to the normal drilling direction, thereby turning the motor in the backward direction making the motor to act as generator. Any power produced is fed back to the powerline. If the ramp down is done too quickly the drill pipe unwinds too quickly and may cause the drill pipe joints to become loose or break. The present system prevents this from happening by controlling the ramp down rate.

Although system described herein utilizes an SCR drive and regulator, it will be understood that the present invention is equally applicable to systems which utilize other means to control the operation of a motor. For example, a DC generator may be used to supply regulated power to a DC motor or a variable frequency drive may be used to supply regulated power to an AC motor.

Figure 4:
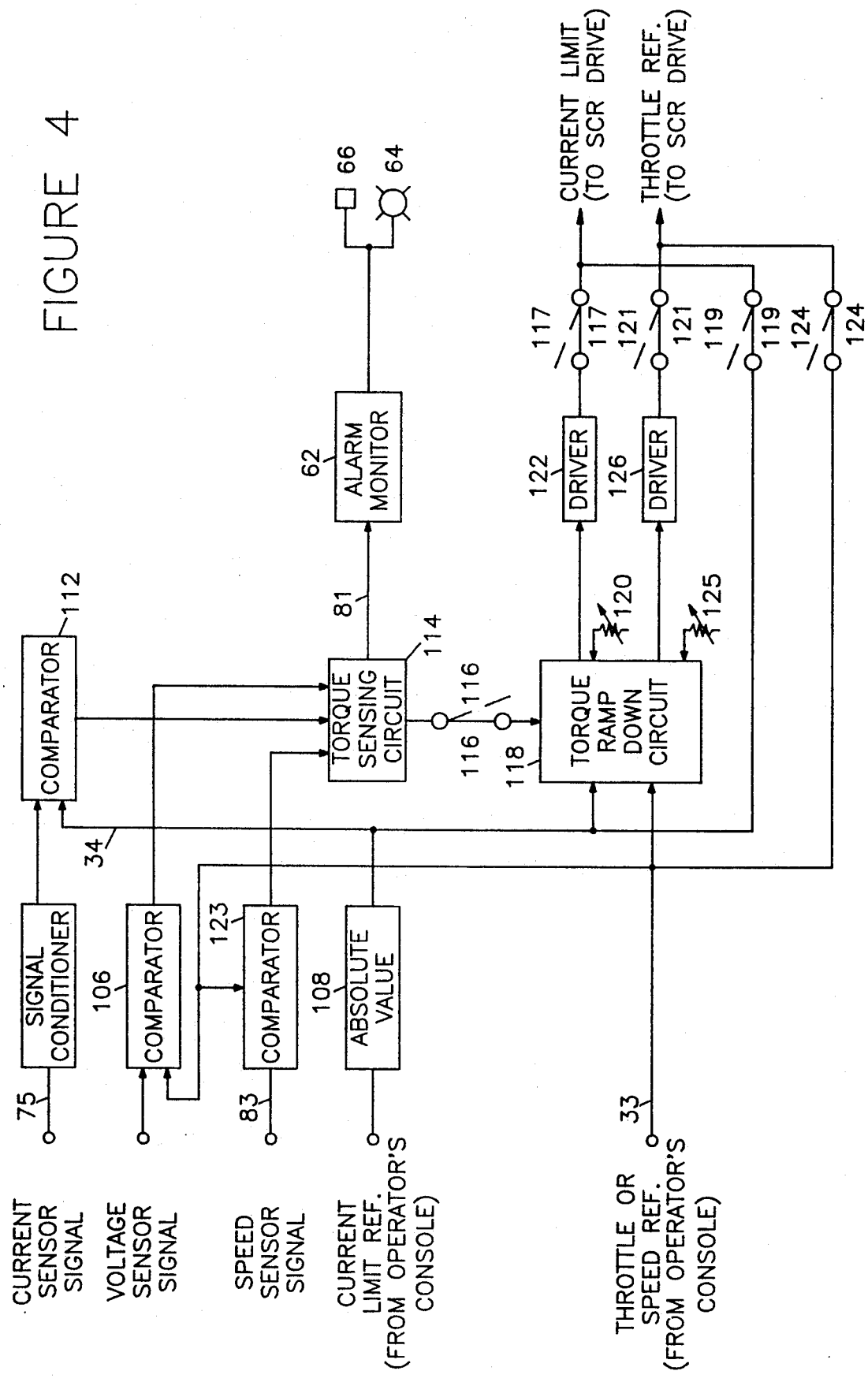
FIG. 4 Shows the functional block diagram of the circuit of the pipe torque control unit of the system of FIG. 2.

FIG. 4 shows the functional block diagram of the circuit for the pipe torque control unit (element 83, FIG. 2). The throttle or speed reference (voltage) set by the operator is fed to a comparator 106 via the line 33 while the motor input voltage (from sensor 12, FIG. 2) is fed through line 73. The comparator 106 compare these voltages and provides the difference of the signals to a torque sensing circuit 114. The upper current limit reference is fed into a signal conditioner where it is filtered and amplified and then fed to a second comparator 112. The current limit reference set by the operator is applied to the comparator 112 via line 34. The comparator 112 compares these values and provides a difference signal t the torque sensing circuit 114. The motor speed signal coming from the speed sensor 82 is fed into the torque sensing circuit 114. The output from the torque sensing circuit 114 is fed to a torque ramp down circuit 118. The solid line indicates one position of the switch 116 while the dotted line 116' shows the second position. The switch 116 as shown in FIG. 4 indicates that it is closed thereby connecting the torque sensing circuit 114 to the torque ramp down circuit 118. The upper current limit reference signal is also applied to an absolute value circuit 108, which provides a signal to the torque ramp down circuit 118 that is proportional to the absolute value of the upper current limit. The throttle reference or speed reference signal is also applied to the torque ramp down circuit 118.

If the operator sets the pipe torque control unit in the automatic mode, the switches 116, 117, 119, 121 and 124 take the position as shown by the respective solid lines. In the manual mode, the switches are set as shown by the dotted lines. A time constant circuit element 120 is adapted to set the ramp down rate for the torque ramp down circuit 118. During operation, the torque sensing circuit, in response to the signals from the comparators 106, 112 and 123 determines whether a pipe-stuck condition is present. If the pipe-stuck criteria is not met, the pipe torque control unit passes the current limit and the throttle reference signals directly to the SCR drive and regulator 40. If the torque sensing circuit determines that the pipe-stuck condition exist, it causes the audio alarm 66 and/or the visual alarm 64 to activate. The torque ramp down starts by latching the absolute value being fed by the circuit 108, and the throttle reference signal, and then starts ramping down the upper current limit at a rate which had previously been set by adjusting the element 120, and supplies the ramp down signal to a drive (amplifier) 122, where it is amplified and fed to the SCR drive and regulator via the switch 117. Similarly, once the upper current limit has been decreased to a predetermined value, the throttle reference signal is ramped down at a rate which had previously been set by adjusting the element 125, and supplies the ramp down signal to a drive (amplifier) 126, where it is amplified and fed to the SCR drive and regulator via switch 121. The circuit shown in FIG. 4 and described above utilizes analog circuits. However, digital circuit, with our without the use of microprocessors may easily be used for their design and use is extremely well known in the art.

Summarizing, the system of the present invention provides regulated power to a motor which turns a drill-pipe for drilling wells. The system continually monitors the drill pipe torque or the motor load and when it detects an overtorque condition of the drill pipe, it activates an alarm and controllably reduces the drill-pipe torque so that it may unwind without causing the pipe joints to become loose or break. This system provides a very safe and efficient means for unwinding an overtorqued or stuck pipe.

While a particular embodiment of the present invention has been shown and described, it will be understood that the invention is not limited thereto, since many modifications and changes may be made without departing from the scope or the spirit of the invention. It is intended that all such variations, modifications and changes be part of this invention and that the present invention as disclosed herein is limited only by the following claims.

What is claimed is:

1. A method of controlling the operation of a DC electric motor, said motor operating a drill-pipe for drilling a well, said method comprising:
   (a) setting an upper current limit for the motor;
   (b) setting a minimum voltage for the motor;
   (c) continually measuring the motor input voltage and current during the time when the motor is in operation; and
   (d) ramping down the upper current limit setting from the upper current limit value to zero at a predetermined rate when the motor input voltage is below the minimum motor voltage and the motor current is greater than the set upper current limit.

2. The method of claim 1 further comprising the step of activating an alarm when the motor input voltage is below the minimum motor voltage and the motor current is greater than the upper current limit.

3. Apparatus for use in drilling a well, said apparatus comprising:
   (a) a motor;
   (b) a voltage sensor for providing the motor input voltage;
   (c) a current sensor for providing the motor input current; and
   (d) a control circuit coupled to said voltage and current sensors for receiving the motor input voltage and current values therefrom, said control circuit adapted to cause the motor input current to decrease at a predetermined rate when the motor input voltage is below a predetermined value and the motor input current is above a predetermined value.

4. Apparatus for regulating the power supplied to a DC motor used for rotating a drill pipe for drilling a well, comprising;
   (a) a silicon control rectifier based system (SCR system) coupled to the motor, the SCR system adapted to adjust the motor input current as a function of the drill pipe torque;
   (b) a control circuit adapted to continually detect the motor input current and speed levels when said motor is in operation, said control circuit causing the SCR circuit to ramp down at a predetermined rate the motor input current to a predetermined level when the control system detects that the motor input speed is below a predetermined level and the motor input current is above a predetermined level.

5. An apparatus for controlling a motor having a predetermined upper current limit and a throttle reference, said motor used for rotating a drill pipe for drilling oil and gas wells, comprising:
   (a) a regulator circuit adapted to regulate the current supplied to the motor as a function of the drill pipe torque
   (b) a voltage sensor for providing the motor input voltage;
   (c) a current sensor for providing the motor input current;
   (d) a control circuit coupled to the regulator circuit and the sensors for causing the regulator circuit to first ramp down the current supplied to the motor and then the throttle reference when the motor input voltage is below a predetermined value and the motor input current is at the upper current limit.

6. The apparatus as claimed in claim 5 further comprising an alarm means coupled to the control circuit, the control circuit activating the alarm means when it the motor input voltage is below the predetermined value and the input current is at the upper operating current limit.

* * * * *